(12) United States Patent
Hickmott

(10) Patent No.: US 6,401,375 B1
(45) Date of Patent: Jun. 11, 2002

(54) PLANT TAG

(75) Inventor: Robert C. Hickmott, Lansing, MI (US)

(73) Assignee: The John Henry Company, Lansing, MI (US)

( * ) Notice: Subject to any disclaimer, the term of this patent is extended or adjusted under 35 U.S.C. 154(b) by 0 days.

(21) Appl. No.: 09/268,809

(22) Filed: Mar. 16, 1999

(51) Int. Cl.⁷ .............................................. G09F 23/00
(52) U.S. Cl. ............................ 40/645; 40/649; 40/653
(58) Field of Search .......................... 40/645, 668, 653, 40/651, 324; 248/156

(56) References Cited

U.S. PATENT DOCUMENTS

| | | | |
|---|---|---|---|
| 1,334,353 A | * | 3/1920 | Des Combes ............. 40/668 X |
| 1,446,841 A | | 2/1923 | Dietsche |
| 1,563,843 A | | 12/1925 | Flood |
| 1,840,707 A | | 1/1932 | Ensko |
| 1,896,695 A | * | 2/1933 | Borovicka ................... 40/645 |
| 2,042,813 A | | 6/1936 | Turbush |
| 2,908,985 A | | 10/1959 | Hartman |
| 3,098,320 A | * | 7/1963 | Estkowski ............... 40/645 X |
| 3,621,809 A | * | 11/1971 | Paxton ....................... 40/645 |
| 3,707,806 A | | 1/1973 | Toews et al. |
| D243,509 S | | 3/1977 | Wheeler |
| 4,027,410 A | | 6/1977 | Wheeler |
| D253,389 S | | 11/1979 | South, Jr. |
| 4,196,533 A | | 4/1980 | Kamphausen |
| 4,631,861 A | | 12/1986 | Wuthrich |
| 4,972,616 A | | 11/1990 | Doll |
| D314,493 S | | 2/1991 | Keane |
| 5,575,107 A | | 11/1996 | Doerr |
| D402,863 S | | 12/1998 | Hickmott |

FOREIGN PATENT DOCUMENTS

| | | |
|---|---|---|
| AU | B52911 | 10/1990 |
| FR | 521038 | 1/1953 |
| FR | 928752 | 6/1963 |
| FR | 1361444 | 8/1964 |
| FR | 2642266 | 3/1990 |
| FR | 502281 | 6/1991 |
| FR | 2656944 | 7/1991 |
| GB | 12908 | of 1893 |
| GB | 23647 | of 1903 |
| GB | 24078 | of 1910 |
| GB | 771835 | * 4/1957 .................. 40/645 |
| GB | 2260308 | 4/1993 |
| NZ | 234539 | 7/1990 |
| NZ | 237813 | 9/1993 |
| WO | 9005352 | 11/1989 |
| WO | 9317412 | 9/1993 |

* cited by examiner

Primary Examiner—Brian K. Green
Assistant Examiner—James M Hewitt
(74) Attorney, Agent, or Firm—Price, Heneveld, Cooper, DeWitt & Litton

(57) ABSTRACT

A polymeric tag has a body and an integral insertion leg which is tapered to facilitate insertion either into the soil or into a slot formed in the edge of a pot. The extending leg includes a plurality of spaced indentations for strengthening the leg as well as a trapezoidal locking tab extending outwardly from the plane of the leg to permit easy insertion into either the soil or pot and resist removal therefrom.

6 Claims, 2 Drawing Sheets

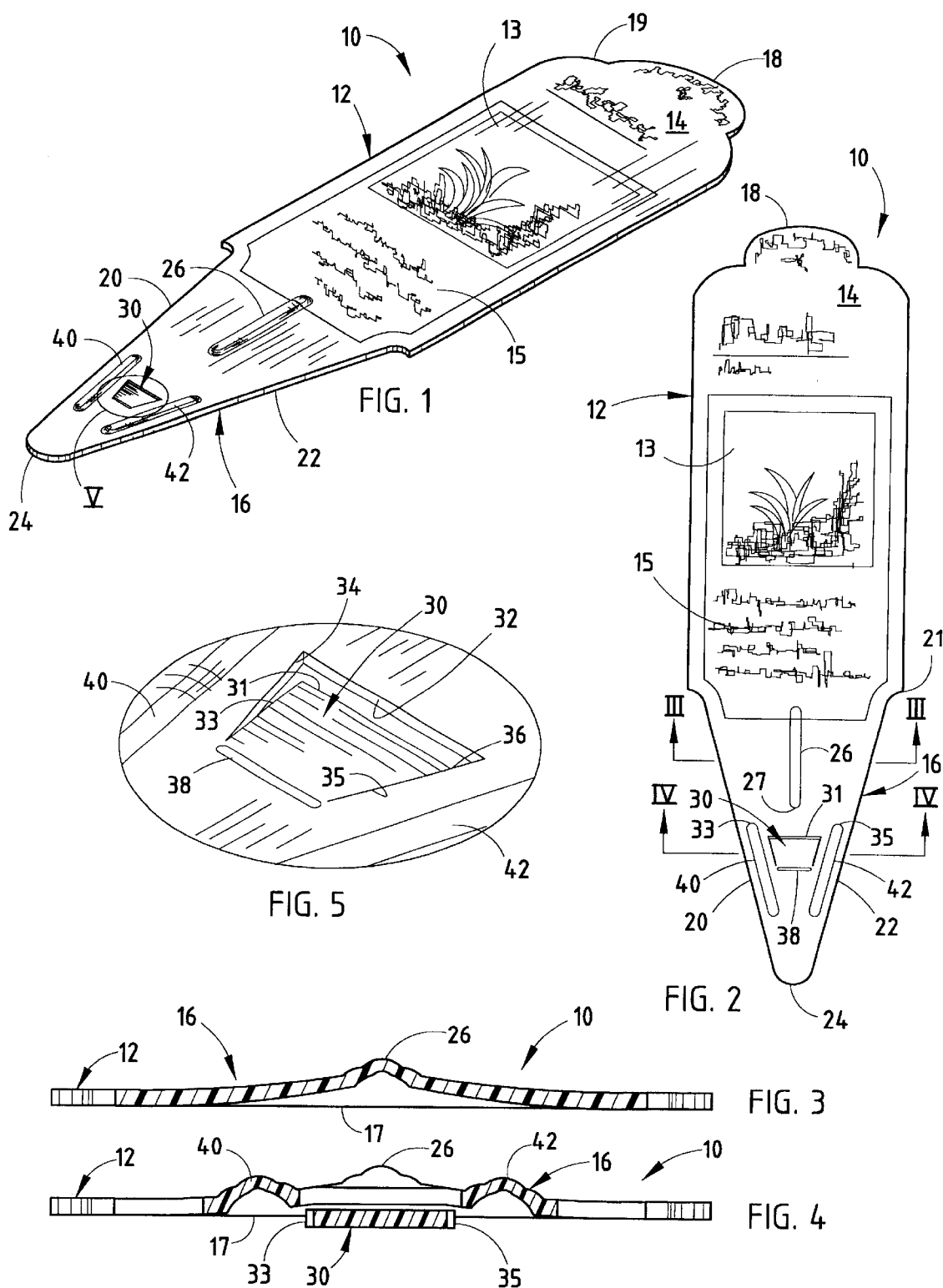

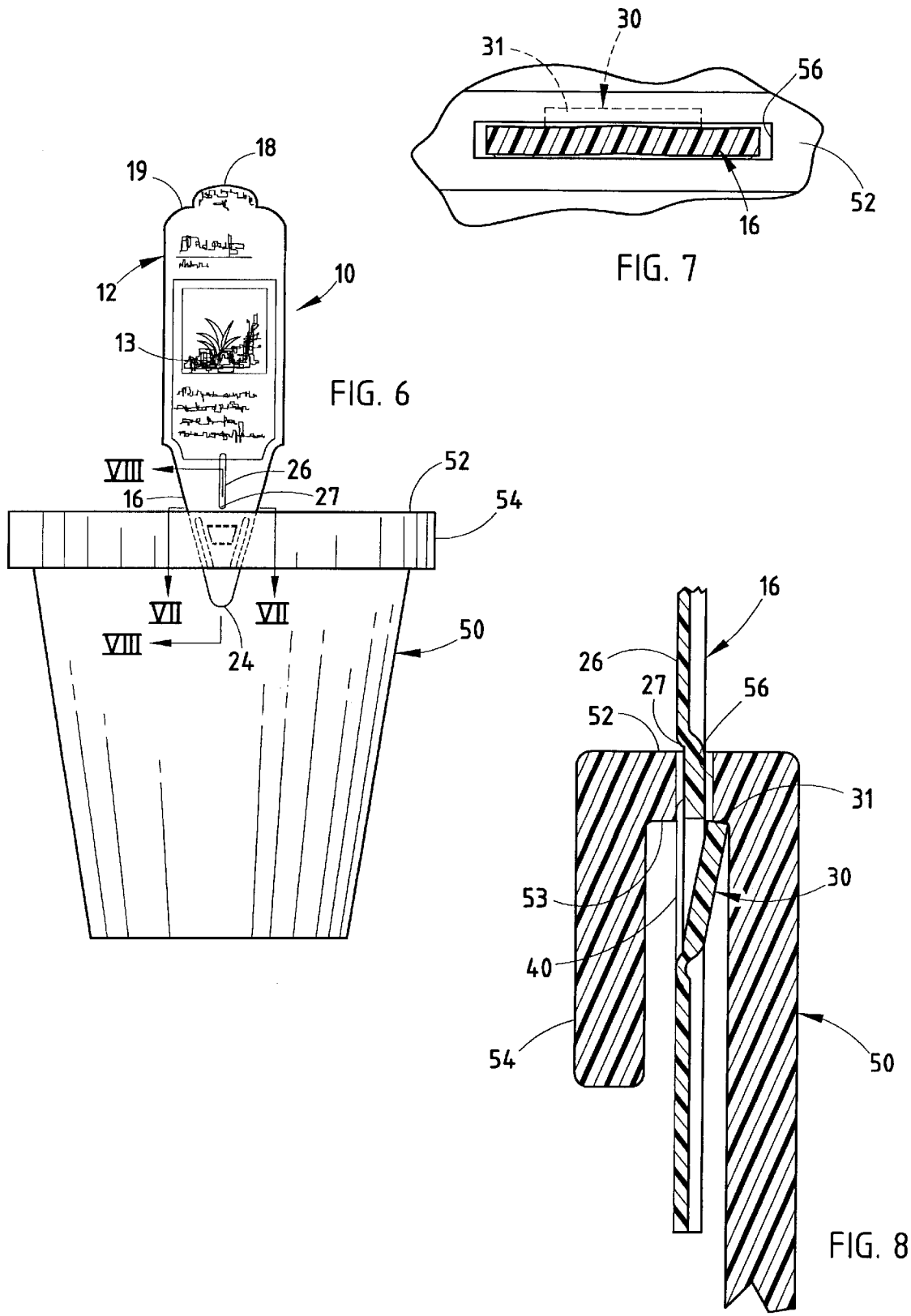

PLANT TAG

BACKGROUND OF THE INVENTION

The present invention relates to plant tags and particularly polymeric tags which can either be placed directly in the soil or attached to a pot.

There exists numerous plant tags or plant stakes made of a polymeric material and having a body which carries either a photograph of the plant and/or planting and care instructions for plants with which the tags are associated. Such tags typically include an end having a pointed tip for insertion into the soil of a pot for the plant and may include a reinforcing indentation to add stiffness to the relatively thin polymeric tag, such as disclosed in U.S. Pat. No. 4,027,410.

In recent years, plants have been sold at retail in relatively thin polymeric pots which include a slotted edge for receiving plant tags directly in the pot as opposed to in the soil. The movement of plants by the retailer sometimes results in lost tags, as does the handling of the plants by retail consumers. In order to prevent these problems, tags have been developed which interlock into slots formed in the edge of a pot, thereby preventing their easy removal. The construction of such tags and pots are represented by Australian Patent No. AU-B-52911/90, PCT publication WO 93/17412 and U.S. Pat. No. 5,575,107, which illustrate different approaches for interlocking tags to slots formed in the upper edge of a polymeric pot. These tags, although successfully locking the tag to the pot due in part to their design and the fact that they are relatively thin, are difficult to manually insert when installing such a tag to a pot.

More recently, tags for insertion into such pots have included opposed slots on the sides of a downwardly depending leg of the tag such that the tag can be forced into the slot of the pot and securely held in position during the organization and placing of the plants on display for sale and in subsequent handling during sale and transport.

Although such tags have their advantages, there remains a need for a dual functioning tag which can be either employed for insertion directly into the soil and which can also, with equal ability, be employed in connection with mounting directly to a slot within the pot such that the tag can be easily inserted and resist removal.

SUMMARY OF THE INVENTION

The tag of the present invention satisfies this need by providing a polymeric tag having a body and an integral downwardly extending insertion leg which is tapered to facilitate insertion either into the soil or into a slot formed in the edge of a pot. The downwardly extending leg includes a plurality of spaced indentations for strengthening the leg as well as a trapezoidal locking tab extending outwardly from the plane of the leg to permit easy insertion into either the soil or pot and resist removal therefrom.

Such tag construction provides an easier to employ tag by the use of the tapered locking tab in the insertion leg and one which has holding characteristics which prevent inadvertent removal of the tag during stocking of potted plants in a retail facility and the subsequent handling of the plants by customers.

These and other features, objects and advantages of the present invention will become apparent upon reading the following description thereof together with reference to the accompanying drawings.

BRIEF DESCRIPTION OF THE DRAWINGS

FIG. 1 is a perspective view of a tag embodying the present invention;

FIG. 2 is a front elevational view of the tag shown in FIG. 1;

FIG. 3 is a cross-sectional view of the tag taken along section lines II—III of FIG. 2;

FIG. 4 is a cross-sectional view of the tag taken along section lines IV—IV of FIG. 2;

FIG. 5 is an enlarged fragmentary perspective view of the circled area V of FIG. 1;

FIG. 6 is a front elevational view of the tag shown in FIGS. 1–5, shown inserted into a pot;

FIG. 7 is an enlarged cross-sectional view taken along section lines VII—VII of FIG. 6, showing the relationship between the tag and pot; and FIG. 8 is an enlarged fragmentary cross-sectional view taken along section lines VIII—VIII of FIG. 6, showing the tag locking structure in greater detail.

DETAILED DESCRIPTION OF THE PREFERRED EMBODIMENT

Referring initially to FIGS. 1–2, there is shown a plant tag 10 embodying the present invention. Tag 10 is made of a polymeric material, preferably stamped and die cut from a sheet of such material in an integral manufacturing step. The tag 10 includes a central body 12 having a front surface 14 and an integral, downwardly extending (as viewed in FIG. 2) insertion leg 16 for insertion of the tag 10 into either soil associated with a potted plant or in the pot directly as disclosed in FIGS. 6–8 described below. The tag body 12 is made of a suitable resilient polymeric material such as polyvinyl chloride, having a thickness of from about 15 to about 22 mills. Other moisture resistant material with sufficient strength to serve as a plant tag could also be employed. The body 12 may include a photograph 13 on front surface 14 of the tag together with a description 15 of the plant with which the tag is associated. The rear surface 17 (FIGS. 3 and 4) of the tag body may also include instructional information as to planting and care information. The tag body 12 may include a integral extension 18 along its top edge 19 providing information such as the general type of the plant (i.e. perennial or annual) to provide a quick reference to purchasers.

The integral insertion leg 16 is tapered triangularly having a first edge 20 and a second edge 22 which converge downwardly and inwardly from the body 12 of tag 10, terminating in a tip 24 which is somewhat rounded but sufficiently sharp to allow the easy insertion of the tag into soil or the pot. Leg 16 also includes a centered indentation 26 positioned near the junction 21 of tag body 12 and leg 16 for stiffening the junction of leg 16 and tag body 12. Indentation 26 is integrally stamped during the manufacturing of the tag and has a length of about 1 inch for a tag having an overall length of 6¾ inch and a width of 2 inches. In the preferred embodiment, the body of tag 10 had a longitudinal dimension of approximately 4 inches and a width of approximately 2 inches to provide a sufficient surface to provide plant identification and care information. The leg 16 had a length of approximately 2¾ inches tapering from approximately 1¾ inch to the tip 24.

Integrally formed in leg 16 intermediate tip 24 and indentation 26 is a locking tab 30 formed from a trapezoidal-shaped cut through the leg 16 during die cutting of the tag. The tab 30 is formed by a top cut 32 and tapered side cuts 34, 36 resulting in the trapezoidal shape locking tab 30 having an end 31 with a width of about ½ inch. Tab 30 includes inwardly tapered sides 33 and 35 terminating in an integral hinge 38 coupling tab 30 to leg 16. During the manufacturing process, the trapezoidal-shaped locking tab 30 is deflected outwardly from the plane of leg 16 and tag body 12 at an angle of approximately 15 degrees, as best seen in FIGS. 4 and 5, such that it retains a non-planar relationship to the tag body once it is inserted either into the soil or into the pot for holding the tag in place.

In addition to the reinforcing indentation 26 spanning the trapezoidal locking tab 30 on opposite sides thereof are additional reinforcing indentations 40 and 42 formed into the tag in a direction opposite that of locking tab 30, as best seen in FIG. 4. Indentations span opposite sides of trapezoidal locking tab 30 to add structural rigidity to the area of the locking tab and on opposite sides thereof. Indentations 40 and 42 each have a length of approximately ¾ inch and a depth of 1/16 inch. By providing a trapezoidal locking tab 30, its top edge 31 (FIG. 2) has a maximum width possible for the triangular-shaped leg 16 and is provided with additional reinforcing strength by the converging spanning indentations 40, 42. Thus, for a relatively small area of the locking leg 16, a relatively wide and strong locking tab is provided for insertion of the tag into the soil of a pot or, as now seen in connection FIGS. 6–8, into the pot itself.

Turning now to FIGS. 6–8, the tag 10 is shown mounted into a pot 50 which is a relatively thin pot made of a polymeric material, such as polyvinyl chloride, having a horizontal rim 52 and a downwardly depending collar 54 extending around the pot 50 which can be round, square, rectangular or other desired shape for receiving plants therein. Rim 52 includes at least one generally rectangular slot 56, as best seen in FIGS. 7 and 8, for receiving leg 16 of tag 10 and, as best seen in FIG. 8, the outwardly deflected locking tab 30 engages the undersurface 53 of rim 52 for locking the tag in place once inserted through slot 56. The rim 52 has a thickness such that the widened tip 31 of locking tab 30 engages the undersurface 53 while the end 27 of indentation 26 extends above rim 52, thereby tending to hold the tag in a vertical position, as seen in FIG. 6, in addition to locking the tag in place.

Thus, with the tag of the present invention, an easy to insert, relatively small tapered locking leg is provided with a trapezoidal locking tab reinforced by indentations on opposite sides to provide a structurally rigid insertion leg with a locking mechanism designed to allow easy insertion and resist removal of the tag from either the plant soil itself or a pot for a plant. It will become apparent to those skilled in the art that various modifications to the preferred embodiment of the invention as described herein can be made without departing from the spirit or scope of the invention as defined by the appended claims.

The invention claimed is:

1. A plant tag comprising:

a tag body; and an insertion leg extending from said tag body for inserting the plant tag into the soil or a pot, said insertion leg including downwardly and inwardly converging edges terminating in a tip and integrally including a tab formed in said insertion leg at a location spaced from said tag body and deflected outwardly from said leg to define a locking tab, wherein said tab includes a free end remote from said tip of said insertion leg and inwardly converging edges terminating in a hinge at a junction of said tab with said insertion leg, wherein said leg further includes a pair of reinforcing indentations formed on opposite sides of and aligned with said locking tab, and further including an additional indentation formed in said leg between said tag body and said locking tab.

2. The tag as defined in claim 1 wherein said additional indentation has an end in spaced relationship to said tab.

3. The tag as defined in claim 2 wherein said locking tab is deflected from said locking leg from about 10 degrees to about 20 degrees.

4. The tag as defined in claim 2 wherein said locking tab is deflected from said locking leg about 15 degrees.

5. The tag as defined in claim 4 wherein said tag is made of a resilient polymeric material.

6. The tag as defined in claim 5 wherein the resilient polymeric material comprises polyvinyl chloride having a thickness of from about 17 mils to about 22 mils.

* * * * *